Figure 2:
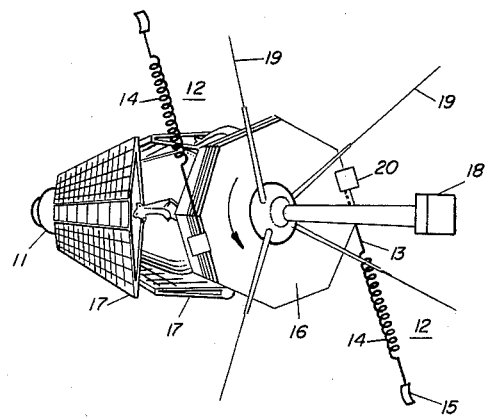

Jan. 18, 1966   J. V. FEDOR ET AL   3,229,930

STRETCH DE-SPIN MECHANISM

Filed March 12, 1963

INVENTOR.
JOSEPH V. FEDOR
HENRY J. CORNILLE, Jr.

BY Earl Levy
G. D. O'Brien

ATTORNEY

United States Patent Office 3,229,930
Patented Jan. 18, 1966

3,229,930
STRETCH DE-SPIN MECHANISM
Joseph V. Fedor, Takoma Park, Md., and Henry J. Cornille, Jr., Detroit, Mich., assignors to the United States of America as represented by the Administrator of the National Aeronautics and Space Administration
Filed Mar. 12, 1963, Ser. No. 264,728
8 Claims. (Cl. 244—1)
(Granted under Title 35, U.S. Code (1952), sec. 266)

The invention described herein may be manufactured and used by or for the Government of the United States of America for governmental purposes without the payment of any royalty thereon or therefor.

The present invention relates to an improved Yo-Yo mechanism for more accurately controlling the initial de-spin of a space vehicle, and, more particularly, to a "stretch" Yo-Yo mechanism which compensates for variations from the expected space vehicle's initial spin rate.

Many space vehicles, and in particular most satellites, because the final stage of the launching rocket is spun bullet-like to provide directional stability, are spinning like tops when they arrive in orbit. The induced spinning of the final stage of the launching rocket (including the satellite) or that of the satellite alone, whichever the case may be, is called initial spin-up or initial spin rate. Usually this initial spin-up must be reduced for the sake of experiments being conducted on the satellite. The spin rate to which the satellite is to be reduced is called the final de-spin or final spin rate.

In the past, spin reduction from the initial spin-up of the satellite was accomplished by the satellite using highly accurate inertia discs, gas jets or passive orientation systems utilizing the earth's magnetic field or the gravitational gradient of the satellite. More recently, this spin reduction has been accomplished by a substantially non-stretchable Yo-Yo. The description of such a Yo-Yo is presented in a patent to W. C. Pilkington, Jr. et al. (Patent No. 3,030,049). It is to be noted, while this patent describes the operation of a non-stretchable Yo-Yo, that the term Yo-Yo is not itself used therein.

Essentially, the non-stretchable Yo-Yo comprises two elongated non-stretchable wires wound around the periphery of the satellite in a plane normal to the satellite's spin axis. One end of each of the wires is fastened to the satellite by an appropriate detachment mechanism. The detachment mechanism can comprise, for example, a hook and eye combination, with the hook being attached to the wire and an eye being affixed to the satellite. Attached to the other end of each of the wires is a weight. A release mechanism, for example a pyrotechnic bolt, keeps each of the rigid wires wound around the satellite and held securely thereto until it is time for the weight-wire combination to be released. Examples of both the release and detachment mechanism are shown and described in Patent No. 3,030,049 (mentioned above).

The description that will now be presented will provide a brief explanation of the operation of a non-stretchable Yo-Yo. When the rocket powered flight is over, the two long wires wound around the spinning satellite are released by the release mechanism and begin unwinding because of the "centrifugal force action" of weights at their ends. As these weights swing outwardly, the spinning satellite provides the kinetic energy to speed them in their ever-winding circles. This energy can be provided only at the expense of the satellite's own spinning motion.

When they have extended the full length of the wires, the weights are swinging much faster, and the satellite is rotating much more slowly than originally. The wires, then, are all unwound and have rotated from a tangential to a substantially radial position. At this point the weights are detached to fly off into space, leaving the satellite spinning at the lower rate. The detachment occurs, when using a detachment mechanism of the type described above, because the shallowness of the hook portion of the detachment mechanism allows the eye portion thereof to slide off.

To put it another way, the swinging, receding weights pull on the wires with forces that resist the satellite's spin. These forces tend, in fact, to spin the satellite in the direction opposite its original spin direction, and the net result is for the satellite's spin rate to be slowed down or stopped. The energy imparted to the weights is then discarded with them.

If not detached, the whirling weights would rewind the wires in the opposite direction; and the satellite would regain its original energy and spin and, accordingly, start the cycle anew like a Yo-Yo on its string.

It can be readily seen from the above description that the choice of the mass of the weight and the length of the wire determines how much de-spin will be achieved by a non-stretchable Yo-Yo on a satellite of given size, weight, spin axis mass moment of inertia and initial spin.

Invariably there are errors in initial satellite spin-up which can be quite large. The presently used spin reduction means, such as the non-stretchable Yo-Yo, do not in themselves provide any built-in means for compensating for these errors, but must instead rely on a separate control means, such as jets from control nozzles, for any compensation whatsoever. Accordingly, without a separate control means being provided, errors are invariably reflected in the final spin rate of the satellite. For example, when a non-stretchable Yo-Yo is used to reduce the spin rate and there is a 30 percent increase above the nominal initial spin rate (design value of initial spin rate), the final spin rate increases by 30 percent over the value for which the satellite was designed to operate.

Another particular source of de-spin error is the uncertainty of the spin axis moment of inertia. Frequently, when the last rocket stage and satellite are spun together, the fuel residue in the last stage rocket results in the spin axis moment of inertia not being accurately known. This variation of moment of inertia from the design value causes or contributes to the error in the final spin rate.

It might more easily be seen how the initial spin-up of the non-stretchable Yo-Yo can affect its final spin rate by illustrating how the value of final spin rate will change when the value of the initial spin-up is either higher or lower than its nominal or design value. For instance, if the design value of the initial spin-up for a satellite is to be 160 r.p.m., before a non-stretchable Yo-Yo of a particular design will reduce the final spin rate to say 74 r.p.m., any variation in the initial spin-up will be reflected in the final spin rate. This is so because, once the mass and length of wire are chosen to provide the proper final spin rate under ideal conditions, there is nothing else provided in the non-stretchable Yo-Yo itself to compensate for any variations from the design value. For example, an initial spin-up of 140 r.p.m. would result in the final spin rate being too low, and an initial spin-up of 175 r.p.m. would result in the final spin rate being too high. It can readily be seen, then, that the value of the initial spin-up is very critical because of the affect it will have on the final spin rate of the satellite.

An appreciable error in the final de-spin value can have detrimental effects since experiments and satellite appendages, such as booms and paddles, are designed to operate at a certain spin rate with a modest tolerance about this.

point. Hence, a large error in de-spin can compromise the experiments and could cause damage to the satellite appendages or cause them not to function.

Accordingly, it is an object of this invention to provide a simple inexpensive structure for reducing the initial spin-up of a satellite, and at the same time, compensating for any variations in the initial spin-up from the designed value.

It is another object of this invention to provide a simple means for both reducing the initial spin-up of a satellite and compensating for any variations therein.

It is a further object of this invention to compensate for the errors in initial spin-up of a satellite so that the final spin rate thereof will be at the designed value.

It is still a further object of this invention to compensate for uncertainties in the spin axis moment of inertia of a space vehicle.

These objects are carried out by stretchable cords or coiled springs being substituted for the elongated wires of the non-stretchable Yo-Yo—the non-stretchable Yo-Yo thus becomes the "stretch" Yo-Yo of the present invention. The stretchable cords provide the Yo-Yo with the ability of compensating for errors in the initial spin rate that are caused, for example, by the pet rockets on the spin table of the launching vehicle. They also provide the Yo-Yo with the ability of compensating for variations in the spin axis moment of inertia of the satellite and last stage rocket in combination. Both of these compensations are achieved without compromising the normal function of the Yo-Yo, i.e., of reducing the initial spin rate of the satellite to a final spin rate. Accordingly, the "stretch" Yo-Yo compromises two stretchable cords, each having a weighted mass attached to one end, the other end thereof being used to attach the cord to the satellite. The weighted stretchable cords are symmetrically wrapped around the periphery of the satellite in a plane normal to the satellite's spin axis and secured in place by a release mechanism (of a type that can be similar to that disclosed in Patent No. 3,030,049 mentioned above). At a pre-selected time after the satellite has reached its initial spin-up the weights are released and the stretchable cords begin unwinding. By angular momentum being transferred to the weighted stretchable cords, they act to reduce the spin of the satellite to a desired value in a manner more fully described below. Because of the ability of the weighted stretchable cords to stretch (shorten or lengthen), the "stretch" Yo-Yo is able to compensate for variations in initial satellite spin-up and uncertainties in the spin axis moment of inertia above or below the designed values and, accordingly, cause the desired final spin rate to be attained.

Figure 1:
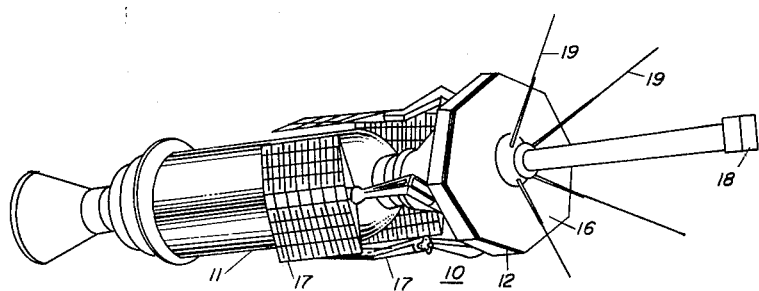

The exact nature of this invention, as well as other objects and advantages thereof, will be readily apparent from consideration of the following specification relating to the annexed drawing in which:

FIGURE 1 illustrates the satellite prior to de-spin with the cords wound around the periphery thereof; and FIGURE 2 illustrates the satellite during de-spin with the cords extending outwardly and tangent to the satellite.

Referring now to the drawing, there is shown a satellite 10 to which is attached the final stage 11 of the launching rocket. The satellite includes top face 16, wherein an arrow is drawn in FIGURE 2 to indicate the satellite direction of spin, and solar paddles 17 attached to the rear portion thereof to act as both an electrical power source and means for slowing down the spin rate of the satellite to some pre-selected value below the final spin rate. After the satellite reaches its final spin rate, the paddles are extended to reduce the spin rate to this pre-selected value. Affixed to the forward portion of front face 16 is experiment box 18 and antenna elements 19. Two stretchable arms 12 are appropriately secured by a detachment mechanism 20 (shown in box form in FIGURE 2 and of a type that can be similar to that disclosed in Patent No. 3,030,049 recited above) to the periphery of front face 16 of satellite 10 so that the detachment mechanisms are diametrically opposite to each other and symmetrical to the satellite's spin axis.

Each of the arms, comprising a wire 13, and end fitting of a hook type, for example (not shown in detail) for attaching an end of wire 13 to the periphery of front face 16, a coiled spring (stretchable wire) 14 having one end attached to the other end of wire 13 and a weight 15 fastened to the other end of coiled spring 14 by means of welding, or the like, depending upon the composition of the spring material, forms in conjunction with satellite 10 a "stretch" Yo-Yo—a simple example of an adaptive control system which senses the spin environment it is in and corrects it.

It should be understood that the arm portions of the "stretch" Yo-Yo can comprise simply a weight, a coiled spring and an end fitting. If such an arrangement is desired, then coiled spring 14 would be connected directly between weight 15 and the end fitting.

An end fitting of the hook type can be used in conjunction with an eye (affixed to the satellite) to form the detachment mechanism. If such a detachment mechanism is used, the hook both secures one end of wire 13 to satellite 10 and allows the arm portion of the "stretch" Yo-Yo to be detached from the satellite at the proper time. A release mechanism or holding means (not shown), also affixed to the satellite, is used to keep each of the arm portions of the "stretch" Yo-Yo wound around the spinning satellite until it is time for the arm portions to be released. The end fitting, detaching mechanism (including the end fitting) and the release mechanism are each of a type that is more fully described in Patent No. 3,030,049 (already recited above).

The "stretch" Yo-Yo operates in a manner similar to that already described above in connection with the non-stretchable Yo-Yo and, additionally, due to the stretching quality of coiled spring 14 in the arms, compensates for errors in the initial spin-up and also for errors in the spin axis moment of inertia. In both of the embodiments so far described, i.e., where each of the arms of the "stretch" Yo-Yo comprise either a coiled spring or coiled spring-wire combination, compensation of these errors is accomplished by the stretching action of coiled spring 14, the stretching action, itself, being caused by centrifugal force being exerted on the weight (end mass) 15 in accordance with the value of the satellite's initial spin-up. Accordingly, if the initial spin-up is greater than the nominal or design value, spring 14 will elongate more than normal during operation and correct for the over spin. On the other hand, if the initial spin-up is less than the nominal or design value, the spring will elongate less than normal during operation and correct for the under spin. The ability of the arms to stretch (lengthen or shorten) in accordance with variations in the initial spin-up is, therefore, built into the "stretch" Yo-Yo. Such is not the case with the non-stretchable Yo-Yo.

In accordance with the above discussion, there are essentially two phases to the "stretch" Yo-Yo spin reduction process: in the first phase the coiled springs 14 change in length and arm portions 12 are tangent to satellite 10; and in the second phase arm portions 12 change their position from tangent to perpendicular to satellite 10. When they are in this latter condition (perpendicular to satellite 10), the arm portions of the "stretch" Yo-Yo are detached. Accordingly, the energy imparted to weights 15 is then discarded.

Design equations have been formulated for computing certain values of the coiled spring characteristics and the value of the weighted mass based upon values chosen for certain other characteristics of the coiled spring. They will be presented below in a discussion of the design of the arms of a particular "stretch" Yo-Yo system that has already been built and in which each arm thereof comprised a weight, a coiled spring and an end fitting and each coiled spring was made from NS 355 spring steel wire manufactured by the National Standard Company of Niles, Michigan. It should be noted, however, that before these equations can be used in determining the characteristics of the "stretch" Yo-Yo's arms, it is necessary that coiled springs, to be used therein, be evaluated to determine whether or not they will be capable of operating in their linear region. A detailed discussion of this evaluation procedure will be presented below.

The following is a list of symbols that will be used in the formulated design equations. There is included a definition of each symbol, the units therefor and the values thereof, where such values were either specified or chosen at the discretion of the designer.

$\dot{\phi}_2$—initial spin rate of the spaced vehicle (radians/second) = 16.755 rad./sec.

$\dot{\phi}_2$—final spin rate of the space vehicle (radians/second) = 7.735 rad./sec.

$r$—spin reduction ratio (ratio of the final spin rate to the initial spin rate)

$l_0$—unstretched length of one arm of the "stretch" Yo-Yo (foot) = 2.365 ft.

$a$—radius of the satellite at point where the arms are attached (foot) = 0.942 ft.

$\delta$—stretch of one "stretch" Yo-Yo arm at release (foot)

$l_f$—total length of one arm at detachment (foot)

$I$—nominal value at inertial about spin axis (slug foot$^2$) = 2.885 slug ft.$^2$ $m_t$—total mass of both arms of the "stretch" Yo-Yo (slug)

$K$—spring constant (pound/foot)

$G$—shear modulus of elasticity of one coiled spring (pound/inch$^2$) = 11.5×10$^6$ lb./in.$^2$ $d$—diameter of the spring wire (inch) = 0.0625 in.

$l_s$—length of a single spring closely wound (inch) = 25 in.

$R$—mean helix radius of the springs (inch)

$\rho$—weight density of the springs (pound/inch$^3$) = 0.282 lb./in.$^3$ $m_s$—mass of one coiled spring (slug)

$m_0$—mass of one spin weight (end mass (slug)

$m_w$—mass of one wire (slug)

For the particular "stretch" Yo-Yo being described herein, $\dot{\phi}_0$, $\dot{\phi}^2$, $a$ and $I$ were each of a specified value; $G$ and $\rho$ were true values for the selected spring material; and $l_0$, $d$ and $l_s$ were chosen at the discretion of the designer. Accordingly, with the values of these symbols known for the particular "stretch" Yo-Yo system, the values of the other symbols thereof were calculated as follows:

$$r = \frac{\dot{\phi}_2}{\dot{\phi}_0} = 0.462 \quad (1)$$

$$\delta = \frac{r(l_0+a)}{1-r} = 2.841 \text{ ft.} \quad (2)$$

$$l_f = l_0 + \delta = 5.206 \text{ ft.} \quad (3)$$

$$m_t = \frac{I(1-r)}{(l_f+a)^2} = 0.0411 \text{ slug} = 600.5 \text{ gm.} \quad (4)$$

$$K = \frac{\dot{\phi}_0^2(1-r)^3 I}{2r(l_0+a)^2} = 12.48 \text{ lb./ft..} = 1.04 \text{ lb./in.} \quad (5)$$

$$R = d^3 \sqrt[3]{\frac{G}{64Kl_s d^4}} = 0.1875 \text{ in.} \quad (6)$$

$$m_s = \frac{G\rho\pi^2}{128K\left(\frac{R}{d^3}\right)^2} = 0.4077 \text{ lb.} = 185.1 \text{ gm.} \quad (7)$$

$$m_0 = \frac{m_t}{2} - \frac{m_s + m_w}{3} = 238.6 \text{ gm.} \quad (8)$$

While in the design of the "stretch" Yo-Yo presented above the coiled springs were made from NS 355 spring steel wire, it should be understood that conventional piano wire or the like could also be used. The NS 355 spring steel does have, however, an appreciably higher tensile strength. Also, the mass of the wire ($m_w$) was neglected since the particular "stretch" Yo-Yo did not use any non-stretchable wire. If wire had been used in conjunction with the coiled spring its value could be computed from the following equation:

$$m_w = \rho_w l_w \frac{(\pi d^2)}{4} \quad (9)$$

where:

$\rho_w$ is the weight density of the non-stretchable wire;

$l_w$ is the length of the wire; and $$\frac{\pi d^2}{4}$$

is the cross sectional area of the wire

Then $l_0$ as given above would also include the length of the non-stretchable wire.

For predictable "stretch" Yo-Yo performance, and particularly, since the coiled springs are the important elements of the "stretch" Yo-Yo design, they should be chosen so that they will operate in their linear region. Hence, to assure this condition, the torsional stress in the spring must be checked before further design of the "stretch" Yo-Yo proceeds. Spott, M.F., on pages 132–137 of "Design of Machine Elements," Prentice-Hall, Inc., Englewood Cliffs, New Jersey, 1960, presents stress equations and spring design criteria which can be used to check if the spring will operate in the linear region.

From Spotts' book the maximum stresss ($S_{max}$) in the spring can be computed from the following equation:

$$S_{max} = \frac{16}{\pi} F_{max} K_s \frac{R}{d^3} \quad (10)$$

where:

$d$ is the diameter of the spring wire in inches and is a value chosen at the discretion of the designer; it has already been defined above;

$R$ is the mean helix radius of the spring in inches; it has already been defined above and can be determined from Equation 6 above;

$K_s$ is the stress concentration factor for torsion and transverse shear; it is usually between 1.0 and 1.2 and obtained from FIGURES 4—4 on page 135 of Spotts' book on the basis of the spring index $C$ which is computed as follows:

$$C = 2R/d; \text{ and} \quad (11)$$

$F_{max}$ is the force in the spring wire when $\dot{\phi}_0$, the initial rate, is 25 percent greater than its designed value, the 25 percent being chosen as a reasonable outside limit of variation in the initial spin rate from its designed value; it can be computed from the following equation:

$$F_{max} = K\delta_{max} \text{ (pounds)} \quad (12)$$

where:

$K$ is the spring constant in pounds/foot; it has already been defined above and determined from Equation 5 above;

$\delta_{max}$ is the value of the stretch of one arm of the "stretch" Yo-Yo at release in feet when $\dot{\phi}_0$, the initial spin rate, is 25 percent greater than its designed value, the 25 percent chosen as an outside limit of variation in the initial spin rate from its designed value; it can be computed from the following equation:

$$\delta_{max} = \frac{-(l_0+a)\sqrt{(l_0+a)^2 + \frac{4I}{K}(\dot{\phi}_{0_{25}}^2 - \dot{\phi}_2^2)}}{4} \quad (13)$$

which is the general equation for $\delta$ at non-optimum of non-design condition and where:

$l_0$, $a$, $I$, $K$ and $\dot{\phi}_2$ are defined above and where:

$\dot{\phi}_{0_{25}}$ is the designed initial spin rate increased by 25 percent or $1.25 \times \dot{\phi}_0$.

$S_{max}$, computed from Equation 10 above, should be within the torsional yield stress prescribed by Spotts for the springs to be operating in the linear region. To be sure this is so, Table 4–1 (showing the values of tension yield point ($S_{yp\ tension}$) for different wire diameters) on page 137 of Spotts' book should be used to provide the tension yield point ($S_{yp\ tension}$) for the particular value $d$ (diameter of the spring wire) chosen as the design value. This value of $S_{yp\ tension}$, obtained from the table, is then used to compute the torsion yield point ($S_{yp\ torsion}$) from the following equation:

$$S_{yp\ torsion} = 0.6\ S_{yp\ tension} \qquad (14)$$

Accordingly, $S_{yp\ torsion}$ is obtained by multiplying $S_{yp\ tension}$ by 0.6. Finally, this value of $S_{yp\ torsion}$ is compared with the maximum stress ($S_{max}$) calculated from Equation 10 above. If the value of $S_{yp\ torsion}$ is greater than $S_{max}$ then the spring will operate in the linear region. On the other hand, if $S_{max}$ is greater than $S_{yp\ torsion}$, the spring will not operate in the linear region. If the latter is so, then another diameter of wire will have to be chosen for the coil springs and the above computation, using Equations 5, 6, and 10 through 14, repeated. These computation will have to be repeated with different diameters of wire until one diameter of wire is obtained in which $S_{yp\ torsion}$ is greater than $S_{max}$.

In summary, the following is the procedure that should be followed in designing the arms of the "stretch" Yo-Yo:

(A) A spring should be selected having length wire size, and type ($1_s$, $d$, $G$, $\rho$).

(B) $R/d^3$ is computed from Equation 6 above.

(C) The spring index $C = 2R/d$ is computed, R being calculated from Equation 6 above and $d$ being the selected value; C is then used to determine the stress concentration factor $K_s$ from FIGURE 4—4 of Spotts' book.

(D) The spring constant (K) and the maximum stretch ($\delta_{max}$) are computed, respectively, from Equations 5 and 13 above; the values for K and $\delta_{max}$ are then inserted in Equation 12 above and the value of $F_{max}$ is computed.

(E) The values determined in steps B, C, and D of this procedure should be substituted in Equation 10 above, and the value of maximum stress ($S_{max}$) is computed therefrom to find out whether it is within the torsional stress limit of the material, the torsional stress being determined by the use of Table 4–1 of Spotts and Equation 14 above.

(F) If $S_{max}$ is greater than the torsional stress limit of the material, then new spring criteria as listed in (A) of this procedure should be selected (usually this will be the wire diameter ($d$)) and the steps (B) through (E) of this procedure should be repeated.

(G) When the stress level ($S_{max}$) proves to be satisfactory, then Equations 1 through 10, the design equation presented above, are used to calculate the spin reduction stretch ($\delta$), the total mass of the two arms of the "stretch" Yo-Yo ($m_t$), the mass of one spring ($m_s$), the mass of one non-stretchable wire ($m_w$) (if non-stretchable wire is used) and the mass of one spin weight ($m_o$).

The foregoing disclosure relates to a preferred embodiment of the invention. Numerous modifications or alterations may be made therein without departing from the spirit and scope of the invention set forth in the appended claims.

What is claimed is:

1. A device for performing the dual function of both reducing the nominal initial spin rate of a rotating body to a designed final spin rate and compensating for variations in the initial spin rate of said rotating body from said nominal initial spin rate comprising: weight means; stretchable arm means attached to said rotating body and to said weight means for extending said weight means from said rotating body and for varying the position of said weight means from said rotating body, whereby said nominal initial spin rate is reduced to said final spin rate and said variations in said initial spin rate are compensated.

2. The device of claim 1 wherein said stretchable arm means includes: a coiled spring.

3. In a space vehicle having spin reduction means and wherein it is desirable to provide compensation for variations in the initial spin-up thereof, said spin reduction means comprising: first and second coiled springs; first and second weights attached to an end of said first and second springs, respectively; and first and second wires connected between the other end of said first and second springs, respectively and said space vehicle.

4. In a space vehicle having weighted de-spin arms attached thereto for reducing the nominal initial spin rate of said space vehicle to a designed final spin rate, the improvement comprising: stretchable means connected in each of said arms for controlling the length thereof, whereby variations from said nominal initial spin rate are compensated so that said space vehicle will attain its designed final spin rate.

5. In a spinning space vehicle having weighted de-spin arms attached thereto for reducing the nominal initial spin rate of said space vehicle to a designed final spin rate and wherein it is desirable to compensate for variations in the spin rate of said space vehicle from said nominal initial spin rate thereof, the improvement comprising: stretching means connected in each of said weighted de-spin arms, whereby said arms will elongate more than a nominal value to correct for over-spin or elongate less than a nominal value to correct for under-spin.

6. In a spinning space vehicle having weighted de-spin arms wound around its periphery and held thereto at the weighted end of said arms by a release mechanism and at the unweighted end of said arms by a detachment mechanism and wherein said weighted arms are released by said release mechanism and unwind and swing outwardly from said space vehicle to reduce the nominal initial spin rate of said space vehicle to a final spin rate and wherein said arms are detached from said space vehicle by a detachment mechanism when said space vehicle is at said final spin rate, the improvement comprising: stretching means connected in each of said de-spin arms for compensating for variations in the initial spin rate of said space vehicle from said nominal initial spin rate thereof, whereby said de-spin arms will elongate more or less than a nominal value to correct, respectively, for over-spin or under-spin of said space vehicle's initial spin rate from said nominal initial spin rate.

7. A method of reducing the spin rate of a space vehicle from a nominal initial spin rate to a designed final spin rate and for compensating for variations from said nominal initial spin rate using positionable weighted de-spin arms comprising the steps of: releasing said weighted positionable arms from said space vehicle; extending said positionable arms away from said space vehicle; controlling the length of said positionable arms while said arms are being extended depending upon whether the initial spin rate is above or below said nominal initial spin rate, and detaching said arms from said space vehicle when said space vehicle reaches said designed final spin rate.

8. A method for compensating for variations from a designed initial spin rate of a freely rotating body while de-spinning said body with weighted arms, including adjustable positioning means, which unwind to extend the weighted portion thereof away from said rotating body, said method comprising the step of: varying the length of said arms by said adjustable positioning means in accordance with variations from said designed initial spin rate at the same time as said arms are being extended.

References Cited by the Examiner
UNITED STATES PATENTS

| | | | |
|---|---|---|---|
| 2,835,548 | 5/1958 | Baumann | 244—1 |
| 3,030,049 | 4/1962 | Pilkington | 244—1 |

FERGUS S. MIDDLETON, *Primary Examiner.*

R. DAVID BLAKESLEE, *Examiner.*